(12) United States Patent
Mani et al.

(10) Patent No.: US 9,796,225 B2
(45) Date of Patent: **\*Oct. 24, 2017**

(54) METHOD OF PREPARING A TIRE FOR MOUNTING

(71) Applicant: Bridgestone Americas Tire Operations, LLC, Nashville, TN (US)

(72) Inventors: Neel K. Mani, Stow, OH (US); John L. Turner, Tucson, AZ (US)

(73) Assignee: Bridgestone Americas Tire Operations, LLC, Nashville, TN (US)

( \* ) Notice: Subject to any disclaimer, the term of this patent is extended or adjusted under 35 U.S.C. 154(b) by 333 days.

This patent is subject to a terminal disclaimer.

(21) Appl. No.: 14/169,176

(22) Filed: Jan. 31, 2014

(65) Prior Publication Data
US 2014/0209251 A1    Jul. 31, 2014

Related U.S. Application Data

(63) Continuation of application No. 12/971,970, filed on Dec. 17, 2010, now Pat. No. 8,678,066.

(51) Int. Cl.
*B60C 25/14*    (2006.01)
*B60C 25/132*    (2006.01)

(52) U.S. Cl.
CPC .......... *B60C 25/142* (2013.01); *B60C 25/132* (2013.01)

(58) Field of Classification Search
CPC ............................ B60C 25/132; B60C 25/142
USPC ...... 157/1, 1.1, 1.17, 1.2, 1.22, 1.28; 425/35
See application file for complete search history.

(56) References Cited

U.S. PATENT DOCUMENTS

| 2,498,953 | A | 2/1950 | Glynn |
| 6,386,031 | B2 | 5/2002 | Colarelli, III et al. |
| 6,615,649 | B1 | 9/2003 | Kokubu et al. |
| 7,740,788 | B2 | 6/2010 | Yoshino et al. |
| 8,661,645 | B2 * | 3/2014 | Lemser ................. B60C 25/138 157/1.17 |
| 2007/0256794 | A1 | 11/2007 | Azam |

FOREIGN PATENT DOCUMENTS

| JP | 3897847 B2 | 3/2007 |
| JP | 2008-001298 A | 1/2008 |
| JP | 4555155 B2 | 9/2010 |

OTHER PUBLICATIONS

Lee, Kwang Je, International Search Report with Written Opinion from PCT/US2011/063354, 9 pp. (Jul. 27, 2012).

\* cited by examiner

*Primary Examiner* — Hadi Shakeri
(74) *Attorney, Agent, or Firm* — Shaun J. Fox; Bryan Jaketic

(57) ABSTRACT

A method of preparing a tire for mounting includes providing a tire having a central axis and at least two bead portions, including a first bead portion and a second bead portion. The method also includes providing a plurality of members and moving the plurality of members outward until each of the plurality of members engages the first bead portion of the tire and causes the first bead portion to deflect outwards at a plurality of locations. The method further includes rotating at least one of the tire and the plurality of members about the central axis of the tire while the plurality of members engages the first bead portion of the tire.

17 Claims, 6 Drawing Sheets

METHOD OF PREPARING A TIRE FOR MOUNTING

CROSS-REFERENCE TO RELATED APPLICATIONS

This application is a continuation of U.S. patent application Ser. No. 12/971,970, filed on Dec. 17, 2010, the disclosure of which is incorporated by reference herein in its entirety.

FIELD OF INVENTION

The present application relates to the field of tire mounting. More particularly, the present application relates to an apparatus and method for preparing a tire for mounting.

BACKGROUND

A pneumatic tire has bead portions that engage a wheel. New tires may be mounted to wheels in an assembly line, and the wheel and tire assembly may be mounted to a vehicle or shipped to another location. New tires may also be shipped to a dealership or mechanic, where they are mounted to existing wheels. If a tire does not sit properly in a wheel, it is removed and remounted to the wheel. A tire with stiff bead portions may be more difficult to mount to the wheel or it may not sit properly on a wheel when it is mounted.

SUMMARY OF THE INVENTION

In one embodiment, a method of preparing a tire for mounting on a wheel is provided. The method includes providing a tire having a pair of bead portions, including a first bead portion and a second bead portion. The method further includes providing a plurality of tire engaging members comprising oppositely disposed telescopic arms. The method also includes moving the plurality of tire engaging members outward, such that a radially outward force is applied to the first bead portion at a plurality of locations. The method further includes rotating the plurality of tire engaging members in a first direction about an axis that is aligned with a central axis of the tire, such that each of the tire engaging members moves relative to the tire while engaging the first bead portion.

In another embodiment, a method of preparing a tire for mounting includes providing a tire having a central axis and at least two bead portions, including a first bead portion and a second bead portion. The method also includes providing a plurality of members and moving the plurality of members outward until each of the plurality of members engages the first bead portion of the tire and causes the first bead portion to deflect outwards at a plurality of locations. The method further includes rotating at least one of the tire and the plurality of members about the central axis of the tire while the plurality of members engages the first bead portion of the tire.

In yet another embodiment, a method of preparing a tire includes providing a tire having a central axis and providing a plurality of rollers. The method further includes moving each of the plurality of rollers into contact with at least one bead portion of the tire such that each of the plurality of rollers applies a radially outward force to the at least one bead portion and causes an outward deflection. The method also includes rotating the tire about the central axis while each of the plurality of rollers continues to apply a radially outward force to the at least one bead portion and cause an outward deflection.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to lines or directions extending along the perimeter of the surface of the tread or bead portions parallel to the equatorial plane perpendicular to the axial direction of the tire.

"Equatorial plane" refers to the plane that is perpendicular to the tire's axis of rotation and passes through the center of the tire's tread.

"Radial" or "radially" refer to a direction perpendicular to the axis of rotation of the tire.

"Tread" refers to that portion of the tire that comes into contact with the road under normal load.

Directions are also stated in this application with reference to the axis of rotation of the tire. The terms "inward" and "inwardly" refer to a general direction towards the axis of the tire, whereas "outward" and "outwardly" refer to a general direction away from the axis of the tire and towards the circumferential tread of the tire. Thus, when relative directional terms such as "inner" and "outer" are used in connection with an element, the "inner" element is spaced closer to the axis of the tire than the "outer" element.

Figure 1:
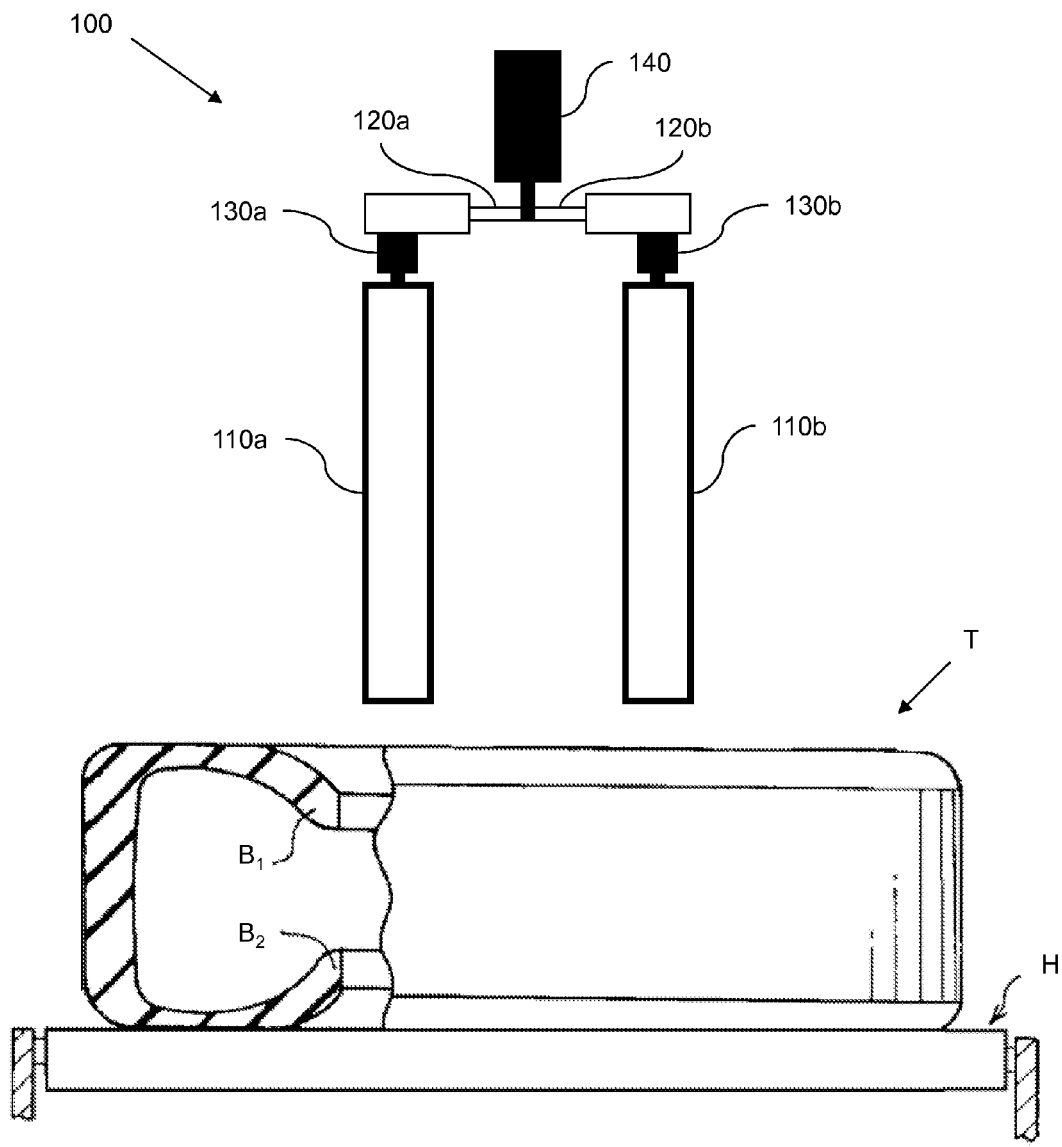
FIG. 1 is a schematic drawing illustrating a side view of one embodiment of a tire preparation device 100.

FIG. 1 is a schematic drawing illustrating a side view of one embodiment of a tire preparation device 100. The tire preparation device 100 may be a station in an assembly line in which tires are mounted to wheels. Alternatively, the tire preparation device 100 may be independent of an assembly line.

The tire preparation device 100 includes a first roller 110a connected to a first telescopic arm 120a and a second roller 110b connected to a second telescopic arm 120b. The first and second rollers 110a,b are tire engaging members configured to engage a bead portion of a tire. Each of the first and second rollers 110a,b is configured to rotate about its axis. Bearings (not shown) may be employed to aid rotation of the rollers 110a,b. In an alternative embodiment (not shown), the rollers 110a,b are replaced with other tire engaging members that are not configured to rotate about their axes.

The first and second telescopic arms 120a,b are shown as collinear. However, it should be understood that the first telescopic arm 120a may be disposed at an acute or obtuse angle with respect to the second telescopic arm 120b.

In the illustrated embodiment, a first roller motor 130a configured to rotate the first roller 110a is disposed between the first roller 110a and the first telescopic arm 120a. Similarly, a second roller motor 130b configured to rotate the second roller 110b is disposed between the second roller 110b and the second telescopic arm 120b. In an alternative embodiment (not shown), alternative rotators, such as pneumatic or hydraulic rotators, are employed to rotate the rollers about their axes. In another alternative embodiment (not shown), neither motors nor other rotators are disposed between first and second rollers 110a,b and the first and second telescopic arms 120a,b.

Additionally, the telescopic arms 120a,b are connected to a main motor 140 configured to rotate the telescopic arms 120a,b about an axis of the main motor 140. In an alternative embodiment (not shown), an alternative rotator, such as a pneumatic or hydraulic rotator, is employed to rotate the telescopic arms 120a,b. In another alternative embodiment, the tire preparation device 100 does not include a main motor.

With continued reference to FIG. 1, the tire preparation device 100 is positioned above a tire T placed on a tire holder H, such that the axis of the tire is aligned with the axis of the main motor 140. In operation, the tire T and the tire preparation device 100 are moved towards each other until the bottom of the rollers 110a,b is at an elevation below a first bead portion $B_1$ of the tire T. Preferably, the tire T and the tire preparation device 100 are moved towards each other until the bottom of the rollers 110a,b is at an elevation below both a first bead portion $B_1$ and a second bead portion $B_2$ of the tire T. In one embodiment, the tire preparation device 100 is lowered. In an alternative embodiment, the tire holder H raises the tire T. In another alternative embodiment, the tire preparation device 100 is lowered while the tire holder H raises the tire T. It should be understood that the tire preparation device 100 may also be positioned below the tire T or to the side of tire T.

Figure 2A:
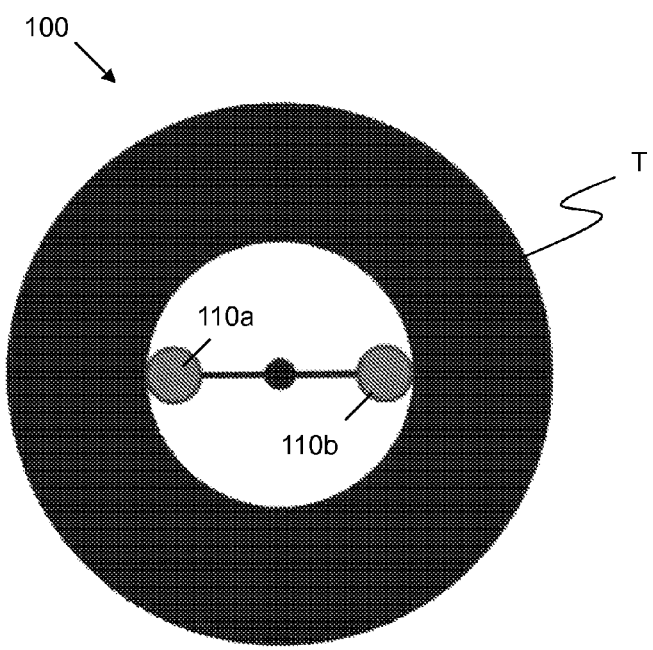
FIGS. 2A-B are schematic drawings illustrating bottom views of a tire being engaged by one embodiment of a tire preparation device 100 of FIG. 1.
Figure 2B:
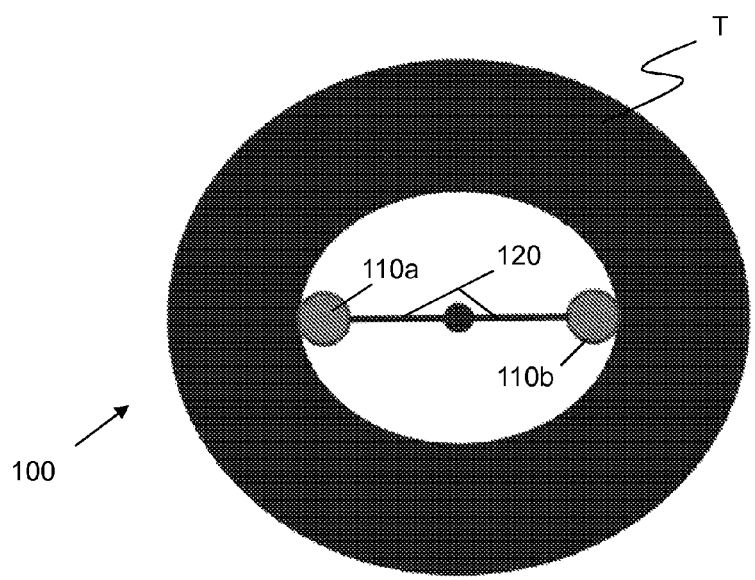

After the tire T and the tire preparation device 100 have been moved towards each other, the telescopic arms 120a,b move the rollers 110a,b outward such that they engage at least one bead portion $B_1$, $B_2$ of the tire T at a plurality of locations. This can be seen in FIGS. 2A and 2B, which are schematic drawings illustrating bottom views of the tire T being engaged by one embodiment of a tire preparation device 100. Because the telescopic arms 120a,b move the rollers outward, they may be referred to as an expander. It should be understood that other expanders may be employed, such as cams. Alternatively, instead of telescopic arms, arms having pivoting linkages may be employed.

After the rollers 110a,b engage the at least one bead portion $B_1$, $B_2$ of the tire T, the telescopic arms 120a,b continue to move the rollers 110a,b outward and apply a radially outward force to the at least one bead portion $B_1$, $B_2$, causing the at least one bead portion $B_1$, $B_2$ to deflect outwards at the points of engagement. In one embodiment, the telescopic arms 120a,b are programmed to telescope outwards by a pre-selected distance, according to the size of the tire being engaged. In this manner, a single tire preparation device 100 may be used to prepare a passenger tire, and then re-programmed to prepare a truck tire. In an alternative embodiment, the tire preparation device includes sensors (not shown) that sense the tire bead portion, and the telescopic arms move outwards a predetermined distance after the tire bead portion is engaged, or until a predetermined force is applied.

In one embodiment, the radially outward force ranges from 25 pounds (110 Newtons) to 800 pounds (3500 Newtons) which causes a deflection of 0.5 inches (1 centimeter) to 4 inches (10 centimeters). However, it should be understood that any desired radially outward force may be applied and that the resulting deflection will depend in part on the stiffness of the tire and its bead portions.

After the radially outward force has been applied, the main motor 140 rotates the telescopic arms 120a,b while the tire T remains stationary. In an alternative embodiment, the main motor 140 may rotate the telescopic arms 120a,b in a first direction while the roller motors 130a,b rotate the rollers 110a,b, causing the tire T to rotate in a second direction opposite the first direction. In another alternative embodiment, the tire preparation device 100 does not include a main motor and the tire preparation device 100 remains stationary while the roller motors 130a,b rotate the rollers 110a,b, causing the tire T to rotate about the tire preparation device 100. In another alternative embodiment, the tire T may be manually rotated about the tire preparation device 100.

The rotation of the main motor 140 and/or the roller motors 130a,b causes relative rotation between the rollers 110a,b and the at least one bead portion $B_1$, $B_2$, while the rollers 110a,b continue to apply the radially outward force. This relative rotation causes a deflection at each point of contact between the rollers 130a,b and the bead portion of the tire T. The main motor 140 and/or the roller motors 130a,b may rotate for a desired length of time or until a desired number of revolutions have been completed. Performing this method may reduce the stiffness of the bead portions $B_1$, $B_2$ of the tire T, so that it may be mounted more easily on a wheel of a vehicle (not shown).

Figure 3A:
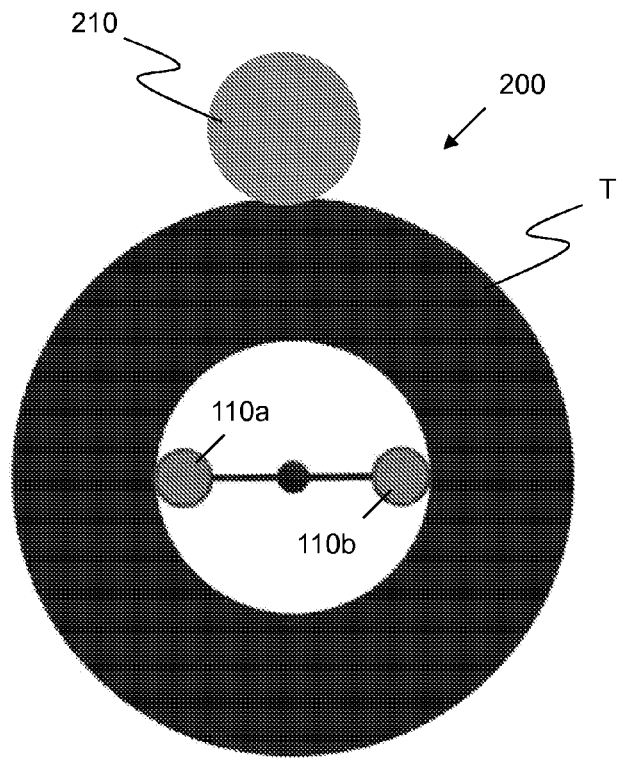
FIGS. 3A-B are schematic drawings illustrating bottom views of a tire being engaged by an alternative embodiment of a tire preparation device.
Figure 3B:
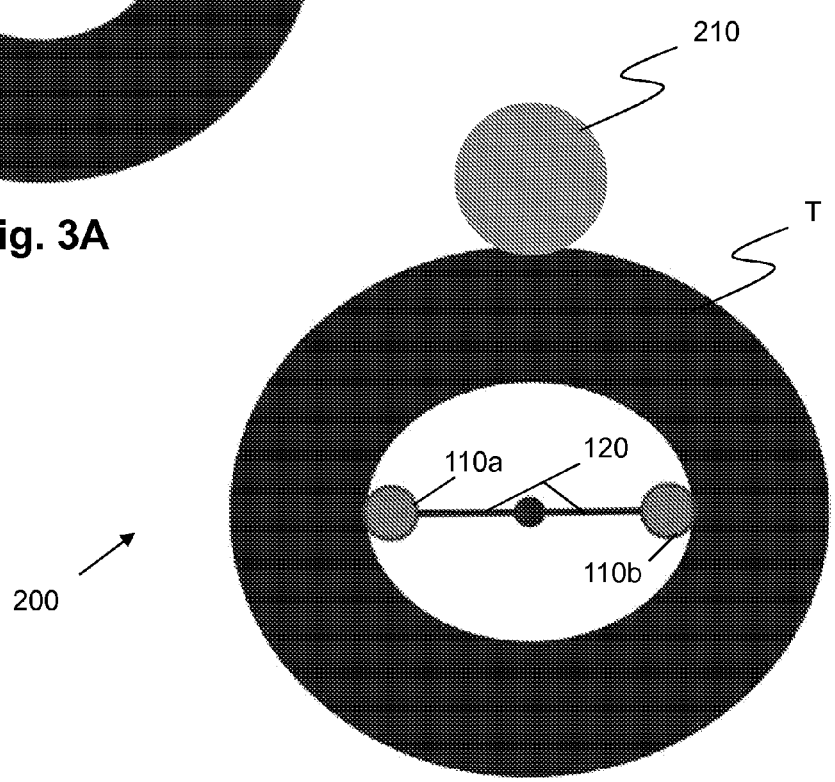

FIGS. 3A-B are schematic drawings illustrating bottom views of a tire being engaged by an alternative embodiment of a tire preparation device 200. The tire preparation device 200 is substantially the same as the tire preparation device 100 illustrated in FIGS. 1 and 2A-B except for the differences described herein. Like reference numerals are used for like components.

The tire preparation device 200 includes a wheel 210 configured to engage a circumferential tread of the tire T. In one embodiment, the wheel 210 is a drive wheel that is rotated by a motor, or by pneumatic or hydraulic means. In such an embodiment, the wheel 210 may be used to drive the tire T about the tire preparation device 200 while the tire preparation device 200 remains stationary. Alternatively, the wheel 210 may be used to drive the tire T about the tire preparation device 200 in a first direction while the main motor 140 drives the rollers 110a,b in a second direction opposite the first direction. In both embodiments, the roller motors 130*a,b* may optionally aid in rotating the tire T about the tire preparation device 200.

In one embodiment, the wheel 210 also is moved against the tire T such that it applies a radially inward force to the circumferential tread of the tire T. In the illustrated embodiment, this radially inward force is substantially perpendicular to the radially outward force provided by the rollers 110*a,b* against the bead portion of the tire T. In one embodiment, the radially inward force provided by the wheel 210 is between 10 pounds (44 Newtons) and 100 pounds (440 Newtons). Alternatively, the radially inward force may be greater than 100 pounds.

In such an embodiment, the wheel 210 may be a drive wheel that rotates the tire T, as explained above, or it may be a passive wheel that is rotated by the tire T when the tire is driven by the rollers 110*a,b* and the roller motors 130*a,b*.

Figure 4:
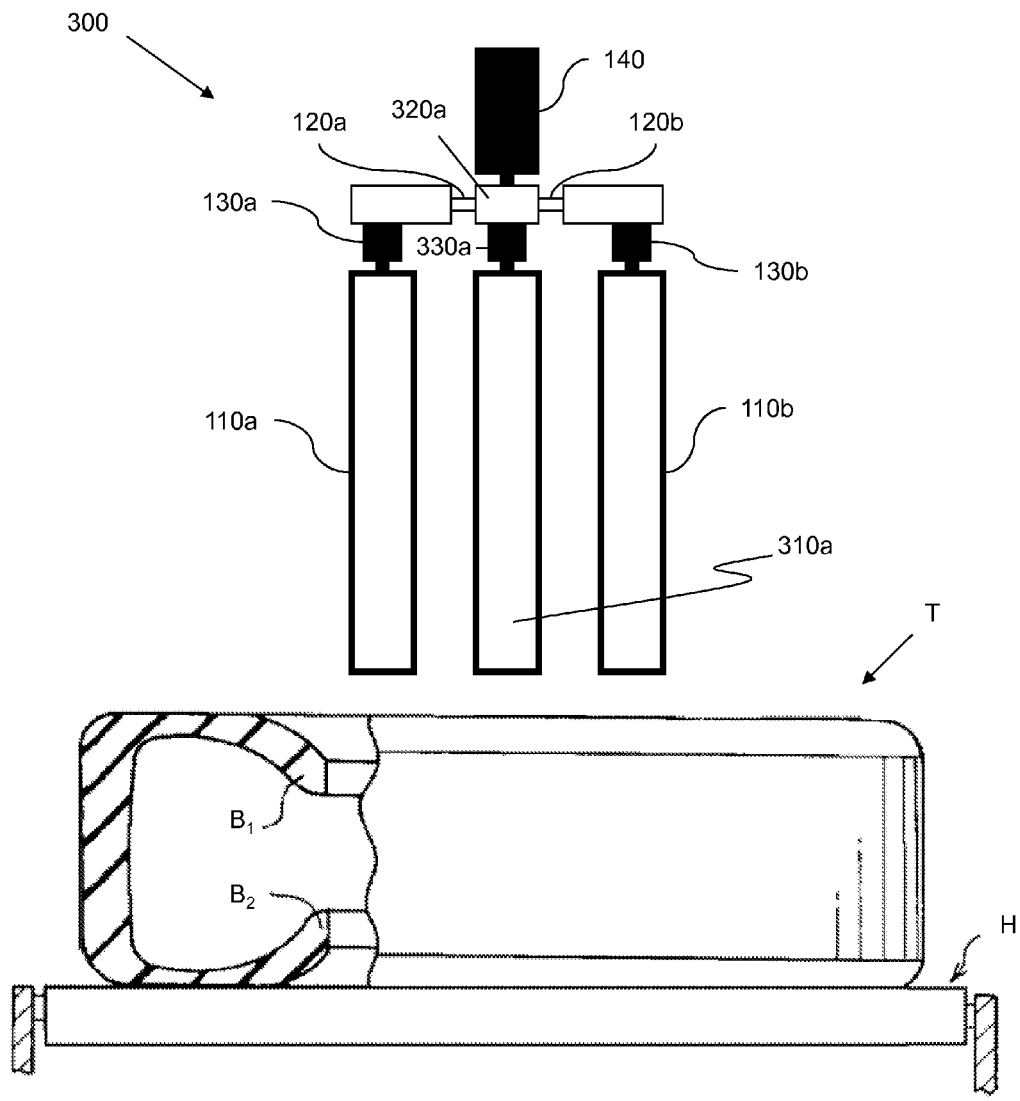
FIG. 4 is a schematic drawing illustrating a side view of another alternative embodiment of a tire preparation device 300.
Figure 5A:
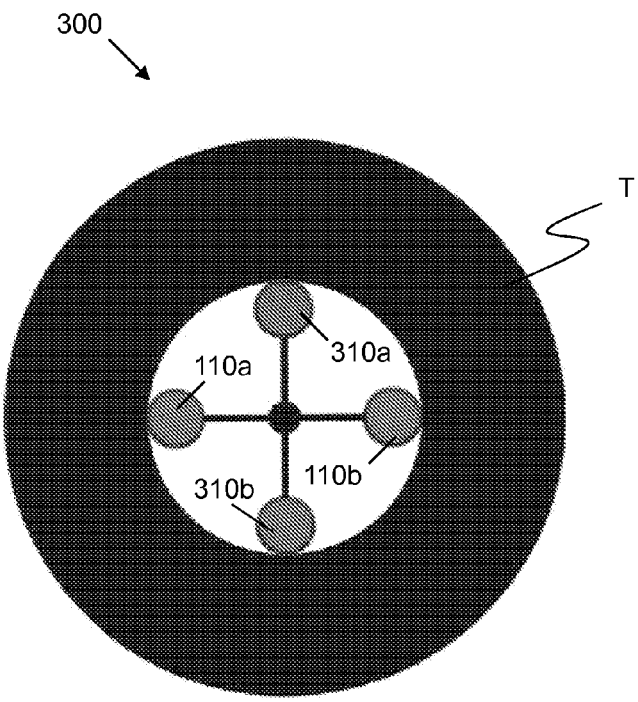
FIGS. 5A-B are schematic drawings illustrating bottom views of a tire being engaged by the alternative embodiment of a tire preparation device 300 of FIG. 4.
Figure 5B:
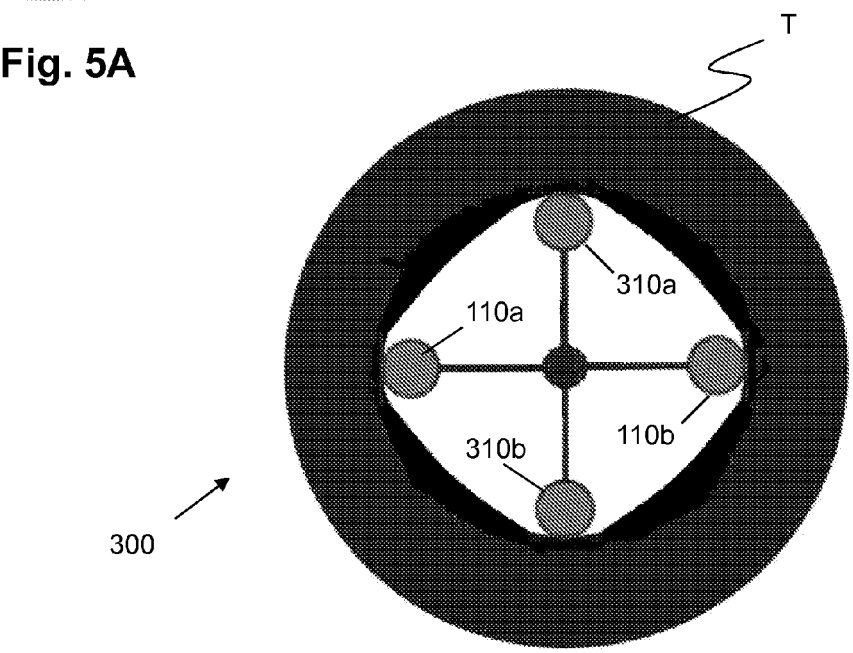

FIG. 4 is a schematic drawing illustrating a side view of another alternative embodiment of a tire preparation device 300. FIGS. 5A-B are schematic drawings illustrating bottom views of a tire being engaged by the alternative embodiment of a tire preparation device 300. The tire preparation device 300 is substantially the same as the tire preparation device 100 illustrated in FIGS. 1 and 2A-B except for the differences described herein. Like reference numerals are used for like components.

The tire preparation device 300 includes a third roller 310*a* attached to a third telescopic arm 320*a* and driven by a third roller motor 330*a,* as well as a fourth roller 310*b* attached to a fourth telescopic arm and driven by a fourth motor (not shown). In an alternative embodiment (not shown), roller motors are not employed.

In the illustrated embodiment, each telescopic arm is positioned substantially perpendicular to its two adjacent arms. However, it should be understood that the telescopic arms may be disposed at any angle.

In operation, the tire preparation device 300 engages the tire T in a similar manner as the tire preparation device 100 described above. As shown in FIGS. 5A-B, all four rollers 110*a,b* and 310*a,b* engage a bead portion of the tire.

Figure 6A:
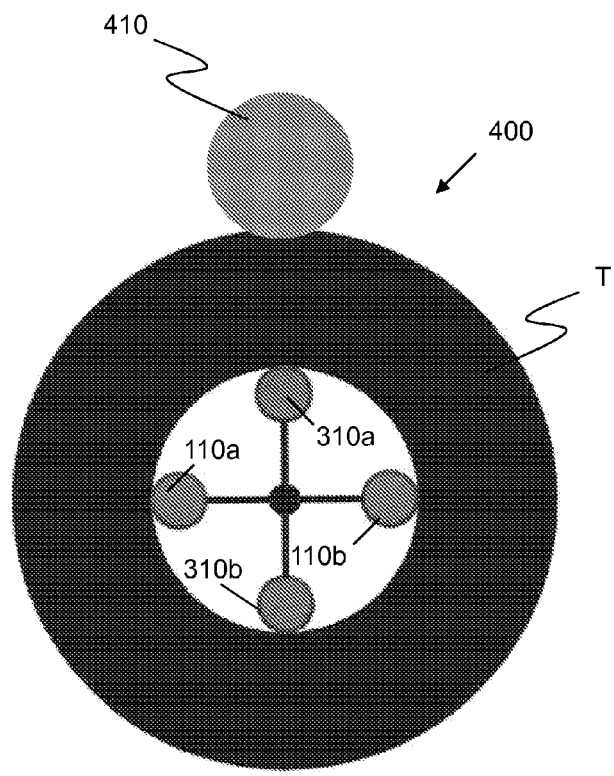
FIGS. 6A-B are schematic drawings illustrating bottom views of a tire being engaged by another alternative embodiment of a tire preparation device.
Figure 6B:
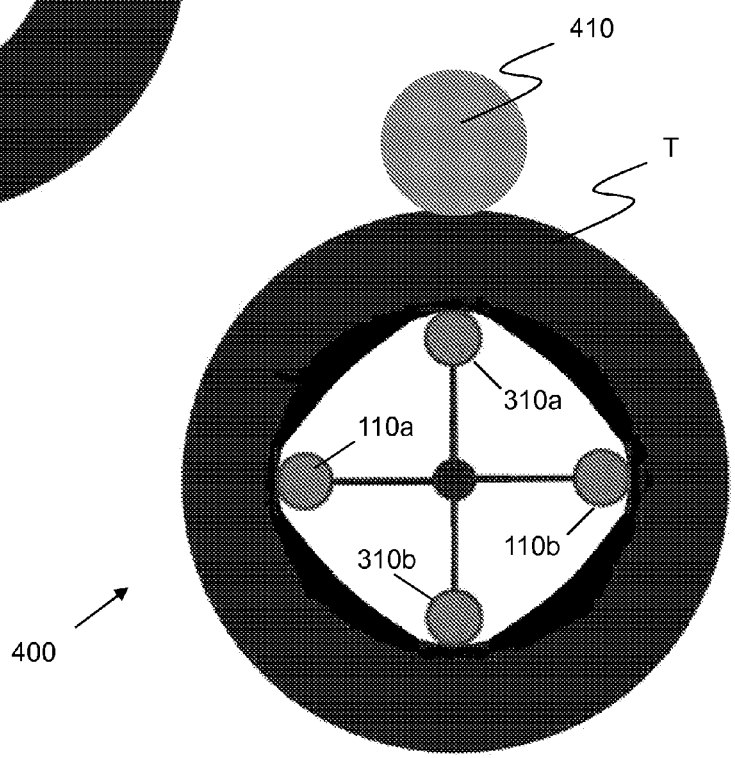

FIGS. 6A-B are schematic drawings illustrating bottom views of a tire being engaged by an alternative embodiment of a tire preparation device 400. The tire preparation device 400 is substantially the same as the tire preparation device 300 illustrated in FIGS. 4 and 5A-B except for the differences described herein. Like reference numerals are used for like components.

The tire preparation device 400 includes a wheel 410 configured to engage a circumferential tread of the tire T. In one embodiment, the wheel 410 is a drive wheel that is rotated by a motor, or by pneumatic or hydraulic means. In such an embodiment, the wheel 210 may be used to drive the tire T about the tire preparation device 400 while the tire preparation device 400 remains stationary. Alternatively, the wheel 410 may be used to drive the tire T about the tire preparation device 400 in a first direction while the main motor 140 drives the rollers 110*a,b* in a second direction opposite the first direction. In both embodiments, the roller motors 130*a,b* may optionally aid in rotating the tire T about the tire preparation device 400.

In one embodiment, the wheel 410 also is moved against the tire T such that it applies a radially inward force to the circumferential tread of the tire T. In the illustrated embodiment, this radially inward force is substantially perpendicular to the radially outward force provided by the rollers 110*a,b* against the bead portion of the tire T. In one embodiment, the radially inward force provided by the wheel 410 is between 10 pounds (44 Newtons) and 100 pounds (440 Newtons). Alternatively, the radially inward force may be greater than 100 pounds.

In such an embodiment, the wheel 410 may be a drive wheel that rotates the tire T, as explained above, or it may be a passive wheel that is rotated by the tire T when the tire is driven by the rollers 110*a,b* and the roller motors 130*a,b*.

Preparing a tire in the manner described above "breaks in" the tire, such that it is more likely to sit properly in a wheel when it is mounted. Preparing a tire in this manner may also improve uniformity of the tire.

The above described embodiments should be understood as exemplary. While embodiments showing two and four rollers are described, it should be understood that any number of tire engaging members may be employed. For example, three rollers may be employed. Similarly, five or more rollers may be employed.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of preparing a vulcanized tire for mounting on a wheel, the method comprising:
   providing a vulcanized tire having a pair of bead portions, including a first bead portion and a second bead portion;
   providing a plurality of tire engaging members comprising oppositely disposed telescopic arms;
   moving the plurality of tire engaging members outward, such that a radially outward force is applied to the first bead portion at a plurality of locations and the first bead portion deflects outward by a distance of 5 to 10 centimeters; and
   rotating the plurality of tire engaging members in a first direction about a central axis of the vulcanized tire, such that each of the tire engaging members moves relative to the vulcanized tire while engaging the first bead portion.

2. The method of claim 1, wherein the plurality of tire engaging members includes two rollers.

3. The method of claim 1, wherein the plurality of tire engaging members includes four rollers.

4. The method of claim 1, wherein the moving the plurality of tire engaging members outward includes moving the plurality of tire engaging members into engagement with both the first bead portion and the second bead portion of the vulcanized tire.

5. The method of claim 1, further comprising rotating the vulcanized tire in a second direction about the central axis of the vulcanized tire, the second direction being opposite the first direction.

6. The method of claim 1, wherein the radially outward a force is between 110 Newtons and 3500 Newtons.

7. The method of claim 1, wherein the rotating the plurality of the tire engaging members causes a deflection at each point of contact between each tire engaging member and the first bead portion.

8. A method of preparing a vulcanized tire for mounting, the method comprising:
   providing a vulcanized tire having a central axis and at least two bead portions, including a first bead portion and a second bead portion;
   providing a plurality of members;
   moving the plurality of members outward until each of the plurality of members engages the first bead portion of the vulcanized tire and causes the first bead portion to deflect outwards at a plurality of locations by a distance of 5 to 10 centimeters; and
   rotating the vulcanized tire and the plurality of members about the central axis of the vulcanized tire while the plurality of members engages the first bead portion of the vulcanized tire, such that the plurality of members rotates relative to the vulcanized tire.

9. The method of claim 8, wherein the moving the plurality of members outward includes moving the plurality of members outward until each of the plurality of members engages the second bead portion of the vulcanized tire and causes the second bead portion to deflect outward at a plurality of locations.

10. A method of claim 8, further comprising rotating each of the plurality of members about its own axis.

11. The method of claim 8, wherein the moving the plurality of members outward includes moving the plurality of members with telescopic arms.

12. The method of claim 8, wherein rotating the vulcanized tire and the plurality of members about the central axis of the vulcanized tire causes a deflection at each point of contact between each member and the first bead portion of the vulcanized tire.

13. The method of preparing a vulcanized tire for mounting on a wheel, the method comprising:
   providing a vulcanized tire having a central axis;
   providing a plurality of rollers;
   moving each of the plurality of rollers into contact with at least one bead portion of the vulcanized tire such that each of the plurality of rollers applies a radially outward force to the at least one bead portion and causes an outward deflection of between 5 and 10 centimeters;
   rotating the plurality of rollers about the central axis of the vulcanized tire; and
   rotating the vulcanized tire about the central axis relative to the plurality of rollers, while each of the plurality of rollers continues to apply a radially outward force to the at least one bead portion and cause an outward deflection.

14. The method of claim 13, wherein the rotating the vulcanized tire is performed by a wheel configured to engage a circumferential tread of the vulcanized tire.

15. A method of claim 14, wherein the wheel is further configured to apply a radially inward force to the vulcanized tire.

16. The method of claim 13, wherein the radially outward force is between 110 Newtons and 3500 Newtons.

17. The method of claim 13, wherein rotating the plurality of rollers causes a deflection at each point of contact between each roller and the at least on bead portion.

* * * * *

UNITED STATES PATENT AND TRADEMARK OFFICE
CERTIFICATE OF CORRECTION

PATENT NO. : 9,796,225 B2  
APPLICATION NO. : 14/169176  
DATED : October 24, 2017  
INVENTOR(S) : Neel K. Mani Page 1 of 1

It is certified that error appears in the above-identified patent and that said Letters Patent is hereby corrected as shown below:

In Column 7, Line 11 in Claim 6 delete "The" and insert -- A --.
In Column 7, Line 12 in Claim 6 delete "a".
In Column 7, Line 14 in Claim 7 delete the second instance of "the".
In Column 7, Line 15 in Claim 7 delete "the".

Signed and Sealed this
Eighth Day of May, 2018

Andrei Iancu
*Director of the United States Patent and Trademark Office*